US012127184B2

(12) United States Patent
Ryu et al.

(10) Patent No.: US 12,127,184 B2
(45) Date of Patent: Oct. 22, 2024

(54) UU DORMANCY AND SIDELINK TRANSMISSION GRANT

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Peter Gaal, San Diego, CA (US); Ozcan Ozturk, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/480,978

(22) Filed: Sep. 21, 2021

(65) Prior Publication Data

US 2022/0095328 A1   Mar. 24, 2022

Related U.S. Application Data

(60) Provisional application No. 63/081,878, filed on Sep. 22, 2020.

(51) Int. Cl.
| | | |
|---|---|---|
| *H04L 1/18* | (2023.01) |
| *H04L 5/00* | (2006.01) |
| *H04W 72/0453* | (2023.01) |
| *H04W 72/1263* | (2023.01) |
| *H04W 72/20* | (2023.01) |
| *H04W 72/23* | (2023.01) |
| *H04W 92/18* | (2009.01) |

(52) U.S. Cl.
CPC ... *H04W 72/1263* (2013.01); *H04W 72/0453* (2013.01); *H04W 72/20* (2023.01); *H04W 72/23* (2023.01); *H04W 92/18* (2013.01)

(58) Field of Classification Search
None
See application file for complete search history.

(56) References Cited

U.S. PATENT DOCUMENTS

| | | |
|---|---|---|
| 2012/0307781 A1 | 12/2012 | Enomoto et al. |
| 2020/0053675 A1 | 2/2020 | Khoryaev et al. |
| 2020/0221271 A1* | 7/2020 | Kim .................. H04L 5/0053 |
| 2020/0267702 A1 | 8/2020 | Kim et al. |

(Continued)

OTHER PUBLICATIONS

International Search Report and Written Opinion—PCT/US2021/051566—ISA/EPO—Apr. 26, 2022.

(Continued)

*Primary Examiner* — Sithu Ko
(74) *Attorney, Agent, or Firm* — ArentFox Schiff LLP

(57) ABSTRACT

This disclosure relates to sidelink carrier aggregation, and includes a method and apparatus for receiving a configuration indicating a subset of Uu component carriers (CCs) of a plurality of Uu CCs from a network entity; receiving a downlink control information (DCI) via the subset of Uu CCs from the network entity based on receiving the configuration, wherein the DCI schedules sidelink transmissions for the first UE via a plurality of sidelink CCs; and communicating on a subset of sidelink CCs with a second user equipment (UE) based on the DCI.

19 Claims, 12 Drawing Sheets

(56) References Cited

U.S. PATENT DOCUMENTS

| | | | | |
|---|---|---|---|---|
| 2020/0344722 A1* | 10/2020 | He | .................... | H04W 72/0446 |
| 2020/0351859 A1* | 11/2020 | Chae | ..................... | H04W 72/20 |
| 2021/0028912 A1* | 1/2021 | Xu | ......................... | H04L 5/001 |
| 2021/0176030 A1* | 6/2021 | Tsai | ..................... | H04W 72/23 |
| 2021/0352580 A1* | 11/2021 | Zhou | .................... | H04W 72/23 |
| 2021/0385710 A1* | 12/2021 | Jin | ....................... | H04L 5/1469 |
| 2022/0255680 A1* | 8/2022 | Moon | ................... | H04L 5/0055 |
| 2023/0284293 A1* | 9/2023 | Hong | .................. | H04W 24/04 |
| | | | | 370/329 |
| 2023/0308905 A1* | 9/2023 | Teyeb | ................. | H04L 5/0035 |
| 2023/0379827 A1* | 11/2023 | Liu | .................. | H04W 52/0229 |

OTHER PUBLICATIONS

Partial International Search Report—PCT/US2021/051566—ISA/EPO—Jan. 24, 2022.

* cited by examiner

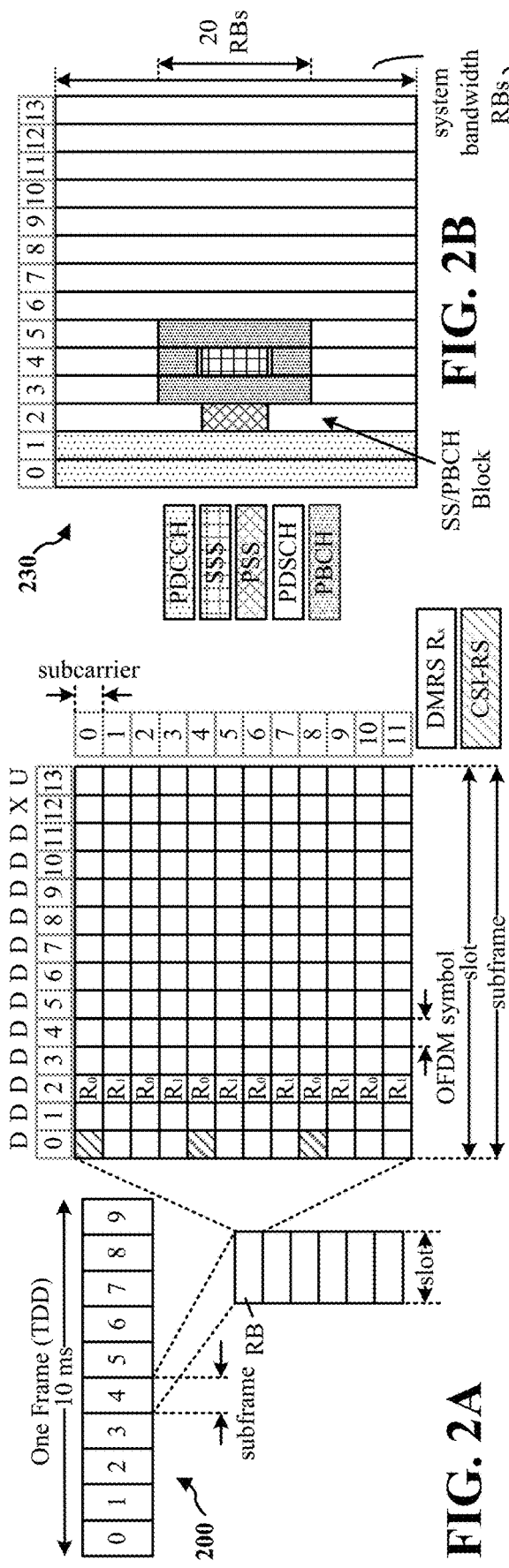
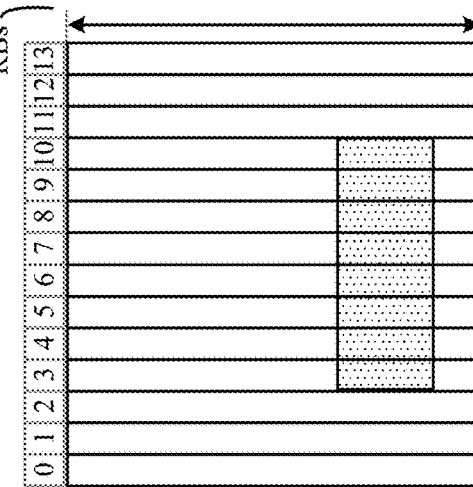
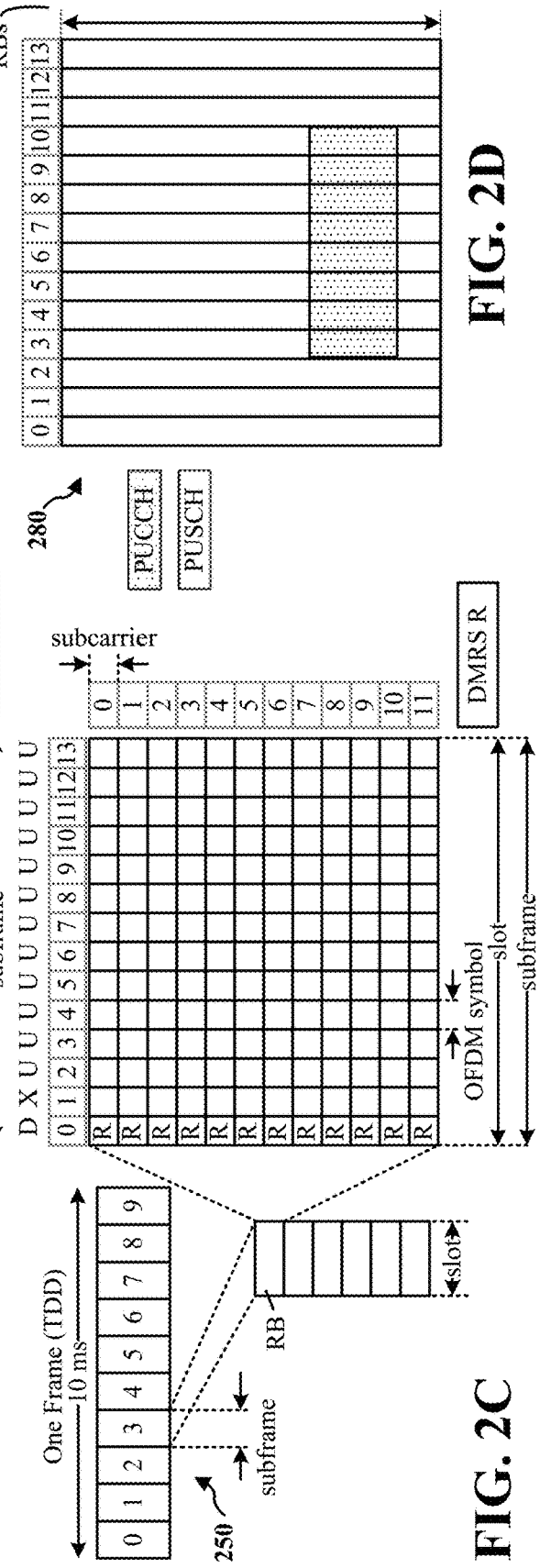
FIG. 2A  FIG. 2B  FIG. 2C  FIG. 2D

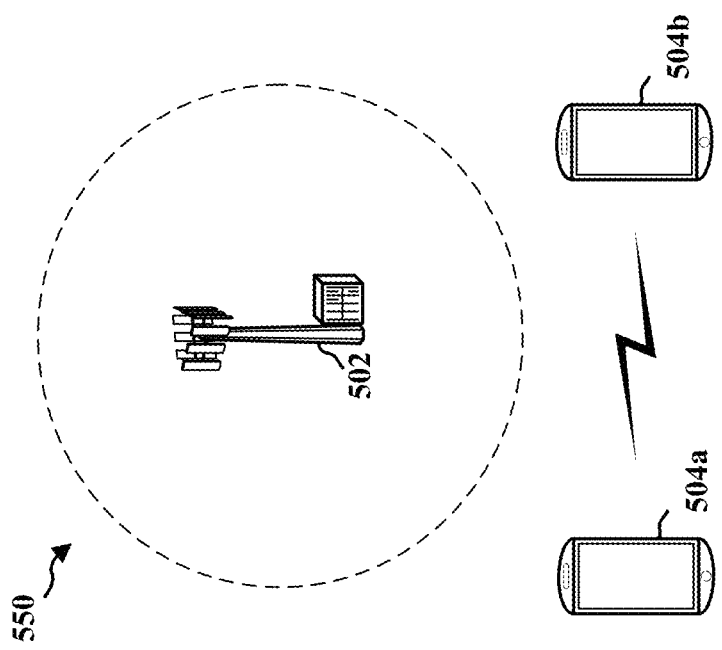
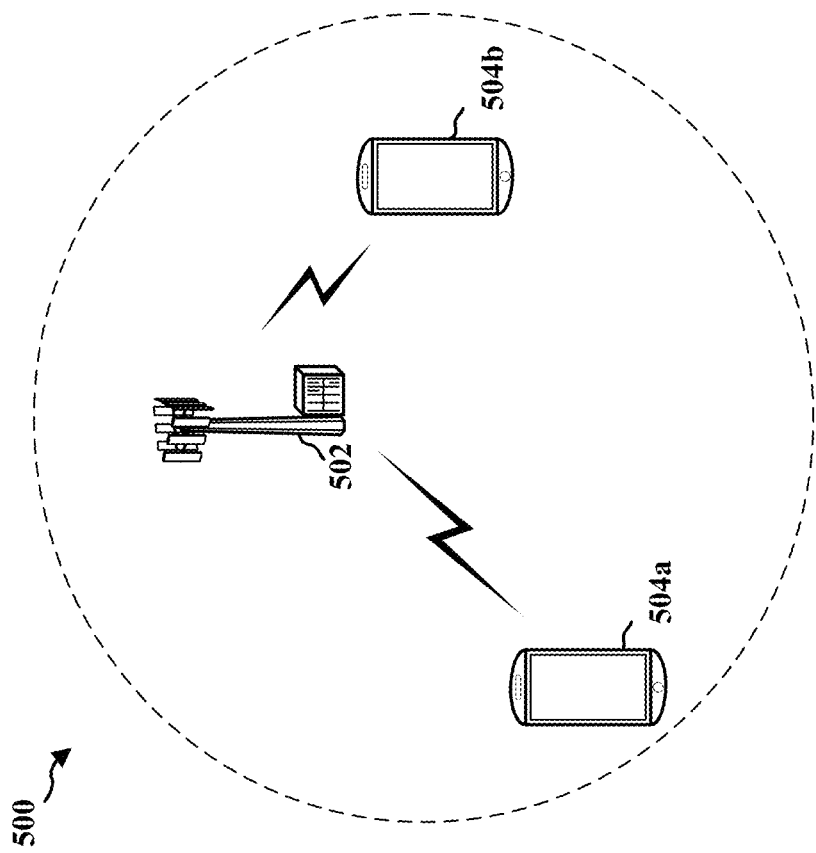
FIG. 5

1000

1002

Determine whether one or more Uu component carriers (CCs) of a subset of Uu CCs is in a dormant state, wherein the subset of Uu CCs corresponds to CCs that transmits a mode 1 transmit grant for a sidelink CC between a first user equipment (UE) and a second UE from the network entity

1004

Configure the sidelink CC to associate with a non-dormant Uu CC of the subset of Uu CCs based on the determination that the one or more Uu CCs of the subset of Uu CCs is in the dormant state

FIG. 10

UU DORMANCY AND SIDELINK TRANSMISSION GRANT

CROSS-REFERENCE TO RELATED APPLICATION(S)

The present application claims benefit of U.S. Provisional Application No. 63/081,878 entitled "UU DORMANCY AND SIDELINK TRANSMISSION GRANT" filed Sep. 22, 2020, which is assigned to the assignee hereof and hereby expressly incorporated by reference herein.

INTRODUCTION

The present disclosure relates generally to communication systems, and more particularly, to enhancements of sidelink carrier aggregation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a first user equipment (UE), comprising receiving a configuration indicating a subset of Uu component carriers (CCs) of a plurality of Uu CCs from a network entity; receiving a downlink control information (DCI) via the subset of Uu CCs from the network entity based on receiving the configuration, wherein the DCI schedules sidelink transmissions for the first UE via a plurality of sidelink CCs; and communicating on a subset of sidelink CCs of the plurality of sidelink CCs with a second UE based on the DCI.

In a further example, an apparatus for wireless communication at a first UE is provided that includes a transceiver, a memory configured to store instructions, and one or more processors communicatively coupled with the transceiver and the memory. The one or more processors are configured to execute the instructions to receive a configuration indicating a subset of Uu CCs of a plurality of Uu CCs from a network entity; receive a DCI via the subset of Uu CCs from the network entity based on receiving the configuration, wherein the DCI schedules sidelink transmissions for the first UE via a plurality of sidelink CCs; and communicate on a subset of sidelink CCs of the plurality of sidelink CCs with a second UE based on the DCI.

In another aspect, an apparatus for wireless communication at a first UE is provided that includes means for receiving a configuration indicating a subset of Uu CCs of a plurality of Uu CCs from a network entity; means for receiving a DCI via the subset of Uu CCs from the network entity based on receiving the configuration, wherein the DCI schedules sidelink transmissions for the first UE via a plurality of sidelink CCs; and means for communicating on a subset of sidelink CCs of the plurality of sidelink CCs with a second UE based on the DCI.

In yet another aspect, a non-transitory computer-readable medium at a first UE is provided including code executable by one or more processors to receive a configuration indicating a subset of Uu CCs of a plurality of Uu CCs from a network entity; receive a DCI via the subset of Uu CCs from the network entity based on receiving the configuration, wherein the DCI schedules sidelink transmissions for the first UE via a plurality of sidelink CCs; and communicate on a subset of sidelink CCs of the plurality of sidelink CCs with a second UE based on the DCI.

Another example implementation includes a method of wireless communication at a network entity, including determining a configuration indicating a subset of Uu CCs of a plurality of Uu CCs; transmitting the configuration to a first UE, wherein the first UE is configured for sidelink communication with a second UE; and transmitting a DCI in the subset of Uu CCs to the first UE in response to transmitting the configuration.

In a further example, an apparatus for wireless communication at a network entity is provided that includes a transceiver, a memory configured to store instructions, and one or more processors communicatively coupled with the transceiver and the memory. The one or more processors are configured to execute the instructions to determine a configuration indicating a subset of Uu CCs of a plurality of Uu CCs; transmit the configuration to a first UE, wherein the first UE is configured for sidelink communication with a second UE; and transmit a DCI in the subset of Uu CCs to the first UE in response to transmitting the configuration.

In another aspect, an apparatus for wireless communication at a network entity is provided that includes means for determining a configuration indicating a subset of Uu CCs of a plurality of Uu CCs; transmitting the configuration to a first UE, wherein the first UE is configured for sidelink communication with a second UE; and means for transmitting a DCI in the subset of Uu CCs to the first UE in response to transmitting the configuration.

In yet another aspect, a non-transitory computer-readable medium at a network entity is provided including code executable by one or more processors to determine a configuration indicating a subset of Uu CCs of a plurality of Uu CCs; transmit the configuration to a first UE, wherein the first UE is configured for sidelink communication with a second UE; and transmit a DCI in the subset of Uu CCs to the first UE in response to transmitting the configuration.

Another example implementation includes a method of wireless communication at a first UE, including determining a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE and a second UE from a network entity; and communicating on the sidelink CC associated with the non-dormant Uu CC of the subset of Uu CCs with the second UE.

In a further example, an apparatus for wireless communication at a first UE is provided that includes a transceiver, a memory configured to store instructions, and one or more processors communicatively coupled with the transceiver and the memory. The one or more processors are configured to execute the instructions to determine a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE and a second UE from a network entity; and communicate on the sidelink CC associated with the non-dormant Uu CC of the subset of Uu CCs with the second UE.

In another aspect, an apparatus for wireless communication at a first UE is provided that includes means for determining a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE and a second UE from a network entity; and means for communicating on the sidelink CC associated with the non-dormant Uu CC of the subset of Uu CCs with the second UE.

In yet another aspect, a non-transitory computer-readable medium at a first UE is provided including code executable by one or more processors to determine a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE and a second UE from a network entity; and communicate on the sidelink CC associated with the non-dormant Uu CC of the subset of Uu CCs with the second UE.

Another example implementation includes a method of wireless communication at a network entity, including determining whether one or more Uu CCs of a subset of Uu CCs is in a dormant state, wherein the subset of Uu CCs corresponds to CCs that transmit a mode 1 transmit grant for a sidelink CC between a first UE and a second UE from the network entity; and configuring the sidelink CC to associate with a non-dormant Uu CC of the subset of Uu CCs based on the determination that the one or more Uu CCs of the subset of Uu CCs is in the dormant state.

In a further example, an apparatus for wireless communication at a network entity is provided that includes a transceiver, a memory configured to store instructions, and one or more processors communicatively coupled with the transceiver and the memory. The one or more processors are configured to execute the instructions to determine whether one or more Uu CCs of a subset of Uu CCs is in a dormant state, wherein the subset of Uu CCs corresponds to CCs that transmit a mode 1 transmit grant for a sidelink CC between a first UE and a second UE from the network entity; and configure the sidelink CC to associate with a non-dormant Uu CC of the subset of Uu CCs based on the determination that the one or more Uu CCs of the subset of Uu CCs is in the dormant state.

In another aspect, an apparatus for wireless communication at a network entity is provided that includes means for determining whether one or more Uu CCs of a subset of Uu CCs is in a dormant state, wherein the subset of Uu CCs corresponds to CCs that transmit a mode 1 transmit grant for a sidelink CC between a first UE and a second UE from the network entity; and means for configuring the sidelink CC to associate with a non-dormant Uu CC of the subset of Uu CCs based on the determination that the one or more Uu CCs of the subset of Uu CCs is in the dormant state.

In yet another aspect, a non-transitory computer-readable medium at a network entity is provided including code executable by one or more processors to determine whether one or more Uu CCs of a subset of Uu CCs is in a dormant state, wherein the subset of Uu CCs corresponds to CCs that transmit a mode 1 transmit grant for a sidelink CC between a first UE and a second UE from the network entity; and configure the sidelink CC to associate with a non-dormant Uu CC of the subset of Uu CCs based on the determination that the one or more Uu CCs of the subset of Uu CCs is in the dormant state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1 in accordance with one or more aspects of the present disclosure.

FIG. 5 is a schematic diagram of an example of a sidelink communication configuration operable in the system of FIG. 1 in accordance with one or more aspects of the present disclosure.

FIG. 10 is a flowchart of another example method of wireless communication of a UE operable in the system of FIG. 1 in accordance with one or more aspects of the present disclosure.

DETAILED DESCRIPTION

Figure 1:
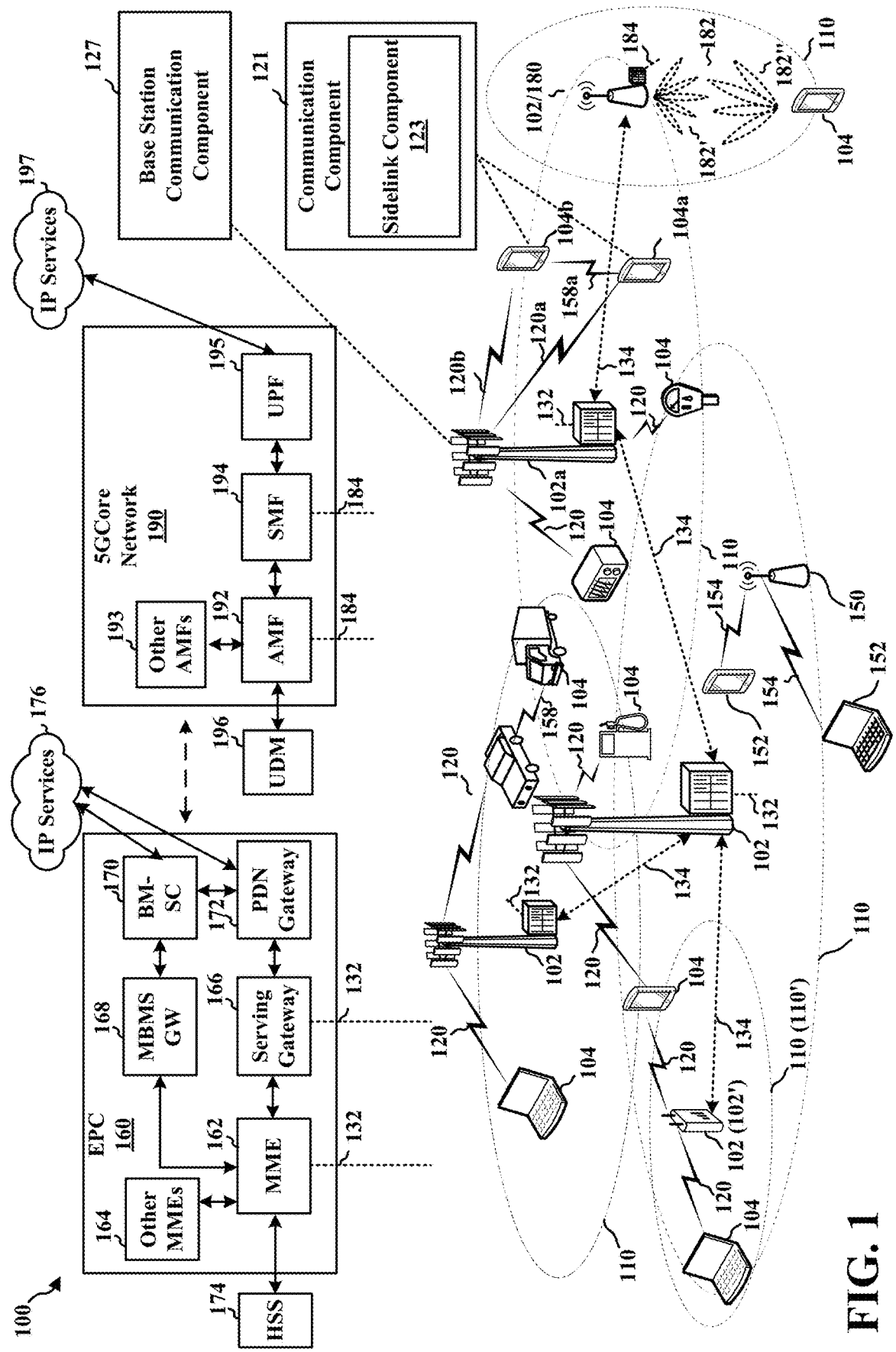
FIG. 1 is a schematic diagram of an example of a wireless communications system and an access network in accordance with one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink communications, which includes a user equipment (UE) communicating from a base station over a sidelink to a second UE, or from the second UE to the base station via the UE. The sidelink may include a physical sidelink shared channel (PSSCH) and a physical sidelink control channel (PSCCH). The PSSCH may carry sidelink data between the first UE and the second UE. In one example, the first UE may be a relay UE and the second UE may be a remote UE. Sidelink transmission may be defined as a one-to-many scheme, meaning that the data may be received by multiple UEs that belong to a group. The PSCCH may carry the sidelink control information (SCI), which may include information about the resource allocation of the PSSCH.

Specifically, the present disclosure relates to enhancements to the sidelink communications, and in particular, to blind searches for mode 1 transmission grants and Uu dormancy. For example, Uu dormancy applies only to secondary cells (SCells). When a SCell transitions to a dormant bandwidth part (BWP) then all PDCCH monitoring is skipped. The dormant SCell may only receive channel state information reference signal (CSI RS) and maintain automatic gain control (AGC). The UE may not monitor the PDCCH for the SCell, such as for cross-carrier scheduling, when the scheduled SCell is in dormancy. The SCells may transition in and out of dormancy in non-overlapping dormancy groups with each dormancy group being signaled by a bit in a downlink control information (DCI). When the DCI bit indicates to transition out of dormancy, the SCell transitions into a default first non-dormant BWP. The UE may stop any uplink transmission, suspend any configured uplink grant Type 1, and clear any configured uplink grant of configured grant Type 2 in the dormancy SCell. Additionally, in some instances, sounding reference signal (SRS) transmission, including aperiodic SRS, semi-periodic SRS, and periodic SRS, is not supported.

In an aspect, for sidelink communications in Mode 1, the network entity (e.g., gNodeB) schedules sidelink transmissions between a first UE and a second UE. For example, the network entity transmits a DCI 3_0 with resource allocation to a sidelink transmit UE for a sidelink transmission. The sidelink transmit UE transmits sidelink control information 1 (SCI1) and SCI2 (PSCCH/PSSCH) to the sidelink receive UE. The SCI1/SCI2 may include information about the sidelink transmission, including information and transmission parameters.

In an aspect, sidelink UEs may use carrier aggregation with multiple sidelink component carriers. With multiple sidelink CCs, the number of DCI 3_0s to monitor by the sidelink UE increases. For example, allowing the UE to search for DCI 3_0 for any sidelink CC in all Uu CCs may result in increased monitoring overhead on the UE. Further, each Uu CC is limited regarding the amount of different sized DCIs that may be transmitted.

As such, the present disclosure mitigates the implementation complexity and potentially negative impacts on UEs that need to perform an increased number of blind searches for DCI 3_0s by dynamically adapting the blind searches. Specifically, present disclosure relates to the determination of a subset of CCs to perform blind searches on and dynamic adaptability regarding dormancy of Uu CCs.

In an aspect, the present disclosure provides apparatus and methods for receiving a configuration indicating a subset of Uu CCs of a plurality of Uu CCs from a network entity; receiving a DCI via the subset of Uu CCs from the network entity based on receiving the configuration, wherein the DCI schedules sidelink transmissions for the first UE via a plurality of sidelink CCs; and communicating on a subset of sidelink CCs of the plurality of sidelink CCs with a second UE based on the DCI.

In an aspect, the present disclosure provides apparatus and methods for determining a configuration indicating a subset of Uu CCs of a plurality of Uu CCs; transmitting the configuration to a first UE, wherein the first UE is configured for sidelink communication with a second UE; and transmitting a DCI in the subset of Uu CCs to the first UE in response to transmitting the configuration.

In an aspect, the present disclosure provides apparatus and methods for determining a sidelink CC to associate with a non-dormant Uu CC of a subset of Uu CCs, wherein the subset of Uu CCs corresponds to CCs that receive a mode 1 transmit grant for the sidelink CC between the first UE and a second UE from a network entity; and communicating on the sidelink CC associated with the non-dormant Uu CC of the subset of Uu CCs with the second UE.

In an aspect, the present disclosure provides apparatus and methods for determining whether one or more Uu CCs of a subset of Uu CCs is in a dormant state, wherein the subset of Uu CCs corresponds to a portion of a plurality of Uu CCs that transmits a mode 1 transmit grant for a sidelink CC between a first UE and a second UE from the network entity; and configuring the sidelink CC to associate with a non-dormant Uu CC of the subset of Uu CCs based on the determination that the one or more Uu CCs of the subset of Uu CCs is in the dormant state. These and other features of the present disclosure are discussed in detail below with regard to FIGS. 1-12.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a UE 104b may include a communication component 121 for assisting with sidelink communications between a base station 102a and a UE 104a. The UE 104a may have a first access link 120a directly with the base station 102a, and a second communication link with the base station 102a via a sidelink 158a with the UE 104b, which has a second access link 120b to the base station 102a. The communication component 121 of the UE 104b may include a sidelink component 123, which may be selectively configured to set-up, activation, and deactivation of sidelink carrier aggregation.

Correspondingly, the UE 104a may be configured to manage communications with both the UE 104b via the sidelink 158a and the base station 102a via the access link 120a.

Similarly, the base station 102a may include a base communication component 127 configured to manage communications with both the UE 104b via the access link 120b and the UE 104a via the access link 120a.

Further details of these operations performed by the UE 104b, the UE 104a, and the base station 102a are discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including UE 104b and UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as UE 104b and UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
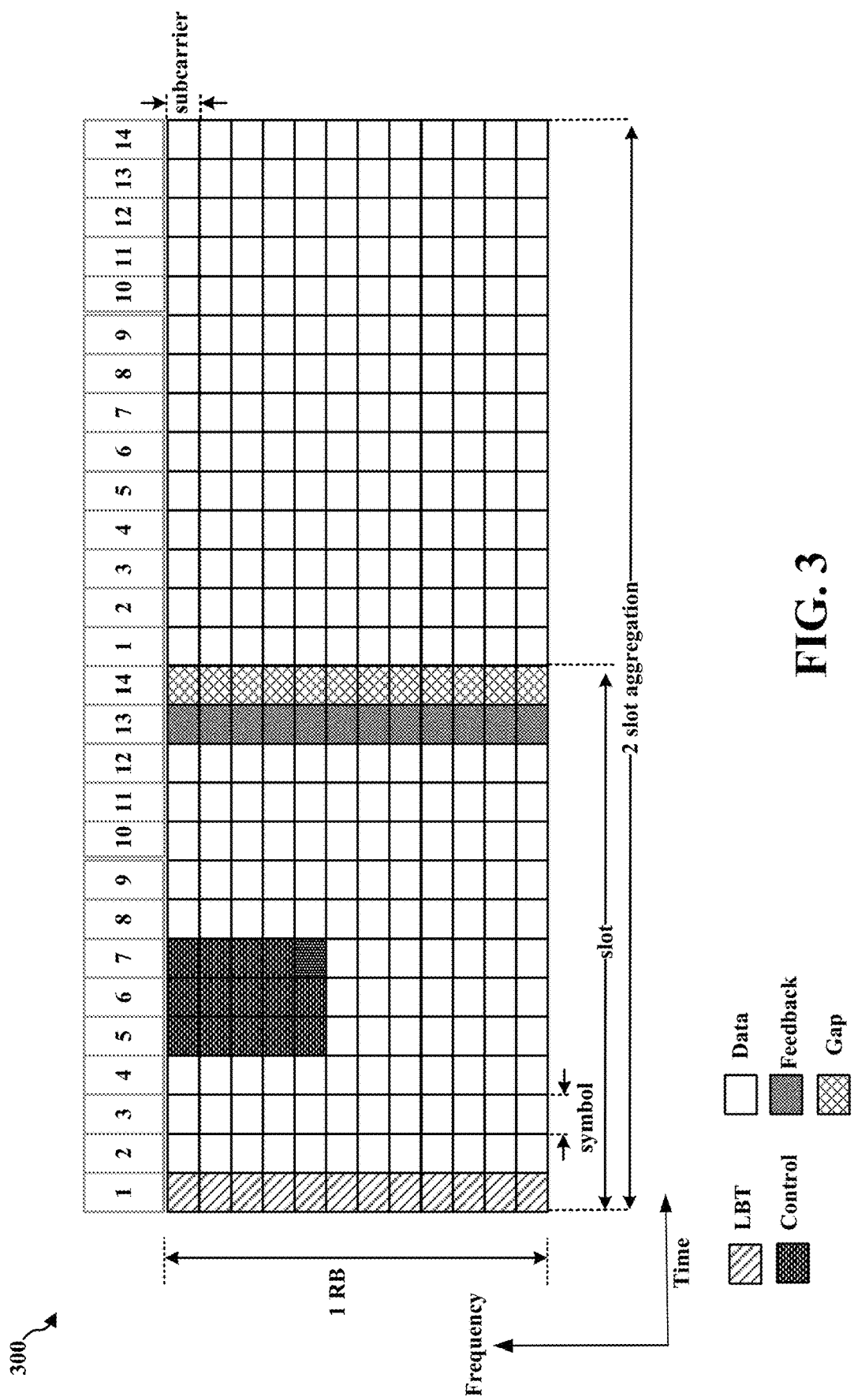
FIG. 3 is a diagram of an example frame structure and resources for sidelink communications between two of the communicating nodes in the system of FIG. 1 in accordance with one or more aspects of the present disclosure.

FIG. 3 is a diagram 300 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
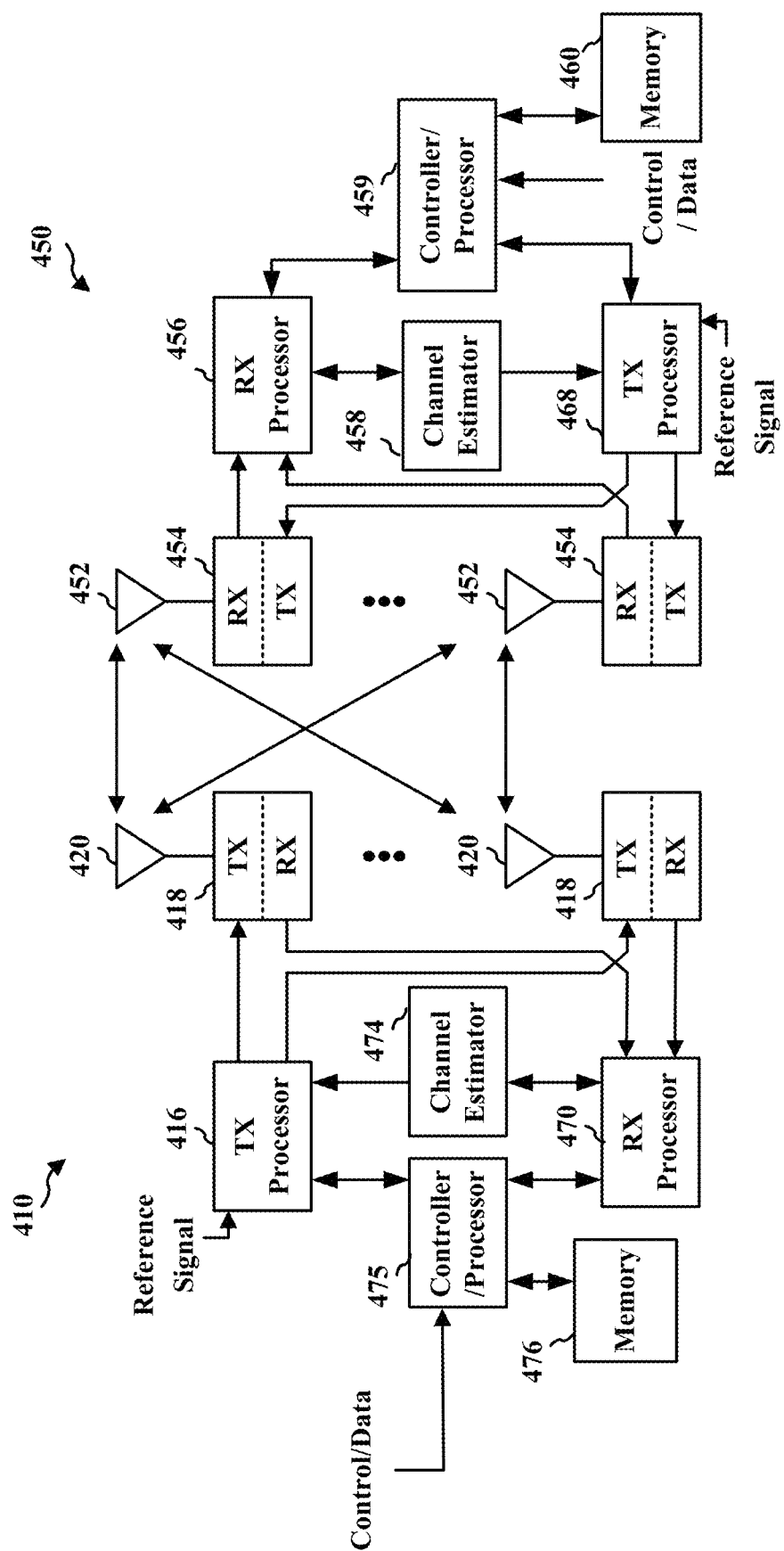
FIG. 4 is a schematic diagram of an example of hardware components of two of the communicating nodes in the system of FIG. 1 in accordance with one or more aspects of the present disclosure.

FIG. 4 is a diagram of hardware components of an example transmitting and/or receiving (TX/RX) nodes 410 and 450, which may be any combinations of base station 102—UE 104 communications, and/or UE 104—UE 104 communications in system 100. For example, such communications may including, but are not limited to, communications such as a base station transmitting to a UE, a UE transmitting to a second UE, a second UE transmitting to a UE, or a UE transmitting to a base station in an access network. In one specific example, the TX/RX node 410 may be an example implementation of base station 102 and where TX/RX node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the TX/RX node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the TX/RX node 450. If multiple spatial streams are destined for the TX/RX node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TX/RX node 410. These soft decisions may be based on channel estimates computed by the channel estimator 458. The soft decisions are then decoded and deinterleaved to recover the data and control signals that were originally transmitted by the TX/RX node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the TX/RX node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the TX/RX node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the TX/RX node 410 in a manner similar to that described in connection with the receiver function at the TX/RX node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, and control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, and/or 127 of FIG. 1.

In an implementation, at least one of the TX processor 416, the RX processor 470, and the controller/processor 475 may be configured to perform aspects in connection with components 121, and/or 127 of FIG. 1.

Referring to FIG. 5, the present aspects generally relate to a sidelink communication scenarios 500 and 550 that includes communicating over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application. In an example, the sidelink communication scenarios may be a sidelink relay communication.

In the sidelink communication scenario 500, a UE 504*a* may establish a Uu communication with one or more base stations 102 and at least one indirect link via a sidelink with a UE 504*b*. In a first case, when the one or more UEs 504*a* and 504*b* are in coverage of the network entity 502, the network entity 502 may configure multiple sidelink CCs for transmission and reception. An initial sidelink beam-pairing may occur on a designated sidelink CC between UE 504*a* and 504*b*. For example, the designated sidelink CC may correspond to at least one of a preconfigured sidelink CC, a CC on which one of the UEs (e.g., UE 504*a*) transmits sidelink SSBs, or a CC on which one of the UEs (e.g., UE 504*b*) successfully receives sidelink SSBs. Additional CCs may be added based on the network entity already knowing the capabilities of the UEs 504*a* and 504*b* and configuring the additional CCs based on these capabilities (e.g., the number of CCs supported by each UE 504*a* and 504*b*), or the UEs 504*a* and 504*b* exchanging their capabilities directly via a sidelink RRC and then transmitting the capabilities to the network entity 502 for their preferred multi-CC configuration. Accordingly, the network entity 502 may configure Mode 1 grants for any sidelink CC to the one or more UEs.

In an aspect for scenario 550, when the one or more UEs 504*a* and 504*b* are out of coverage of the network entity 502, the one or more UEs 504*a* and 504*b* perform a sidelink exchange (e.g., sidelink RRC) instead of via the network entity 502. Once exchanged, the one or more UEs 504*a* and 504*b* use Mode 2 grants for any sidelink CC. In some implementations, Mode 1-like operations may occur with a first UE 504*a* scheduling another UE 504*b* if the first UE 504*a* is engaged in a star topology like behavior similar to a network entity.

Figure 6:
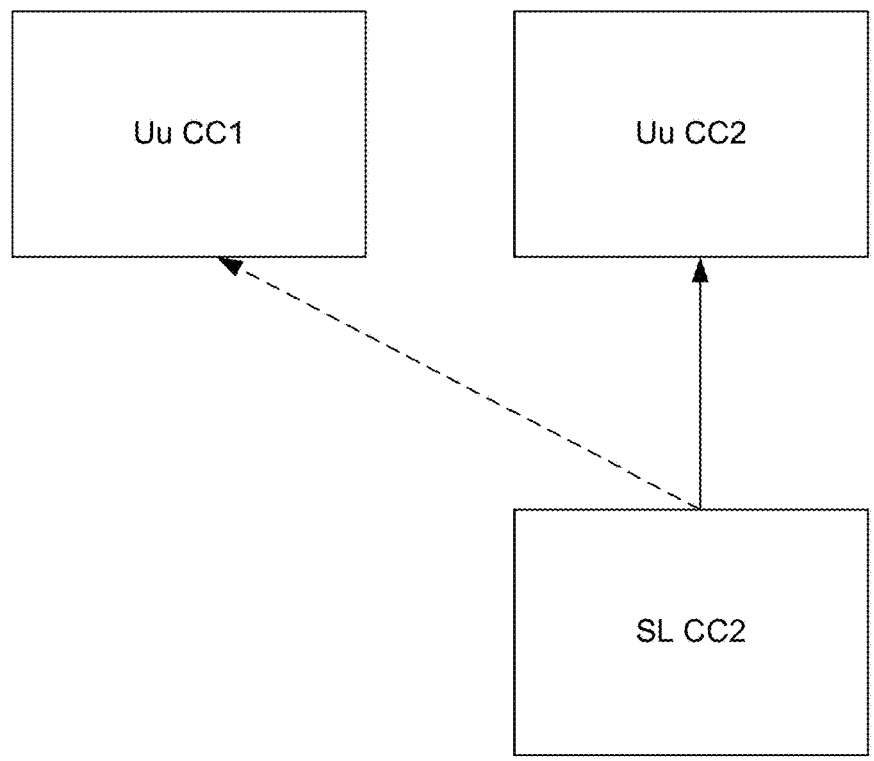
FIG. 6 is a schematic diagram of determining Uu component carrier dormancy in accordance with one or more aspects of the present disclosure.

Referring to FIG. 6, the present aspects generally relate to a sidelink communication scenario 600 that includes communicating over a sidelink component carrier. For example in sidelink communication scenario 600, Mode 1 control for sidelink CC2 is received in Uu CC2. When Uu CC2 transitions to dormancy, SL CC2 is associated with Uu CC1 to received Mode 1 control. For each sidelink component carrier, UE 104 may determine a subset of Uu CC in which mode 1 transmission grants (e.g., any sidelink control) are received for the sidelink CC. If the associated Uu CC transitions into dormancy, then a network entity, e.g., base station 102, may dynamically configure the sidelink CC to associate with a non-dormant Uu CC.

In an aspect, a reassociation control message may be part of Uu dormancy indication (e.g., a wake-up signal or a non-fallback DCI). In another aspect, the reassociation control message may be transmitted separate from the dormancy indication. For example, a DCI and/or media access control (MAC) control element (CE) message may indicate to the UE to reassociate all of the sidelink CCs that are currently associated with the now dormant Uu CC with another non-dormant Uu CC.

In an aspect, the UE 104 may be configured to associate the sidelink CC to a non-dormant Uu CC based on a configuration rule. For example, the UE 104 may be configured to move to a next indexed Uu CC that is not dormant.

In an aspect, reassociation may occur for a sidelink CC only if all of the sidelink CCs currently associated with the Uu CCs are dormant. For example, the sidelink CC may be configured to associate with Uu CC1 and Uu CC2 if Uu CC2 transitions into dormancy. The UE may receive sidelink control in Uu CC1. In an example, when a Uu CC transitions into dormancy, one or more of the PDCCH monitoring configuration of the Uu CC is transferred to another non-dormant Uu CC via dynamic configuration or rule based configuration.

Figure 7:
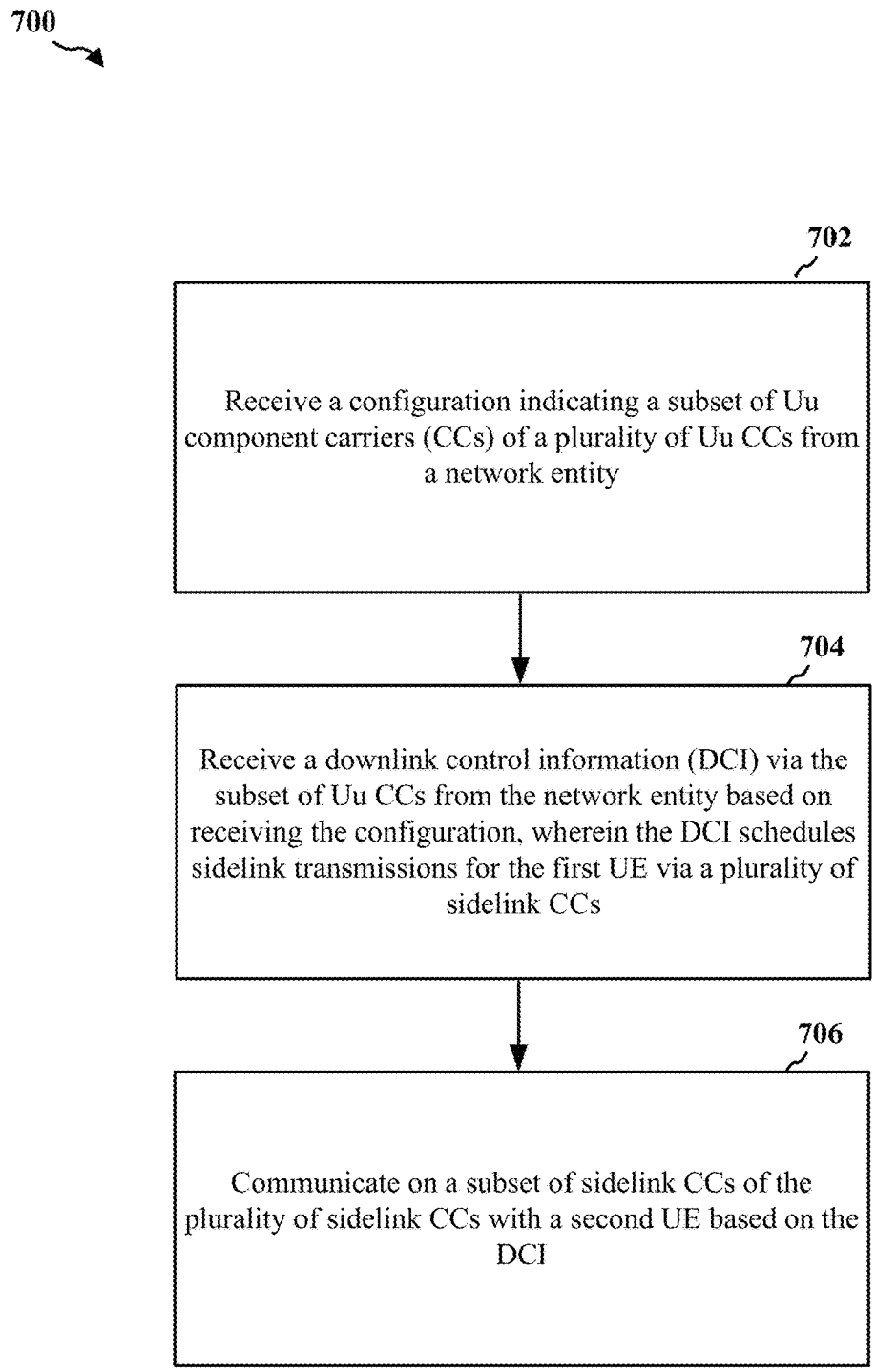
FIG. 7 is a flowchart of another example method of wireless communication of a first UE operable in the system of FIG. 1 in accordance with one or more aspects of the present disclosure.
Figure 11:
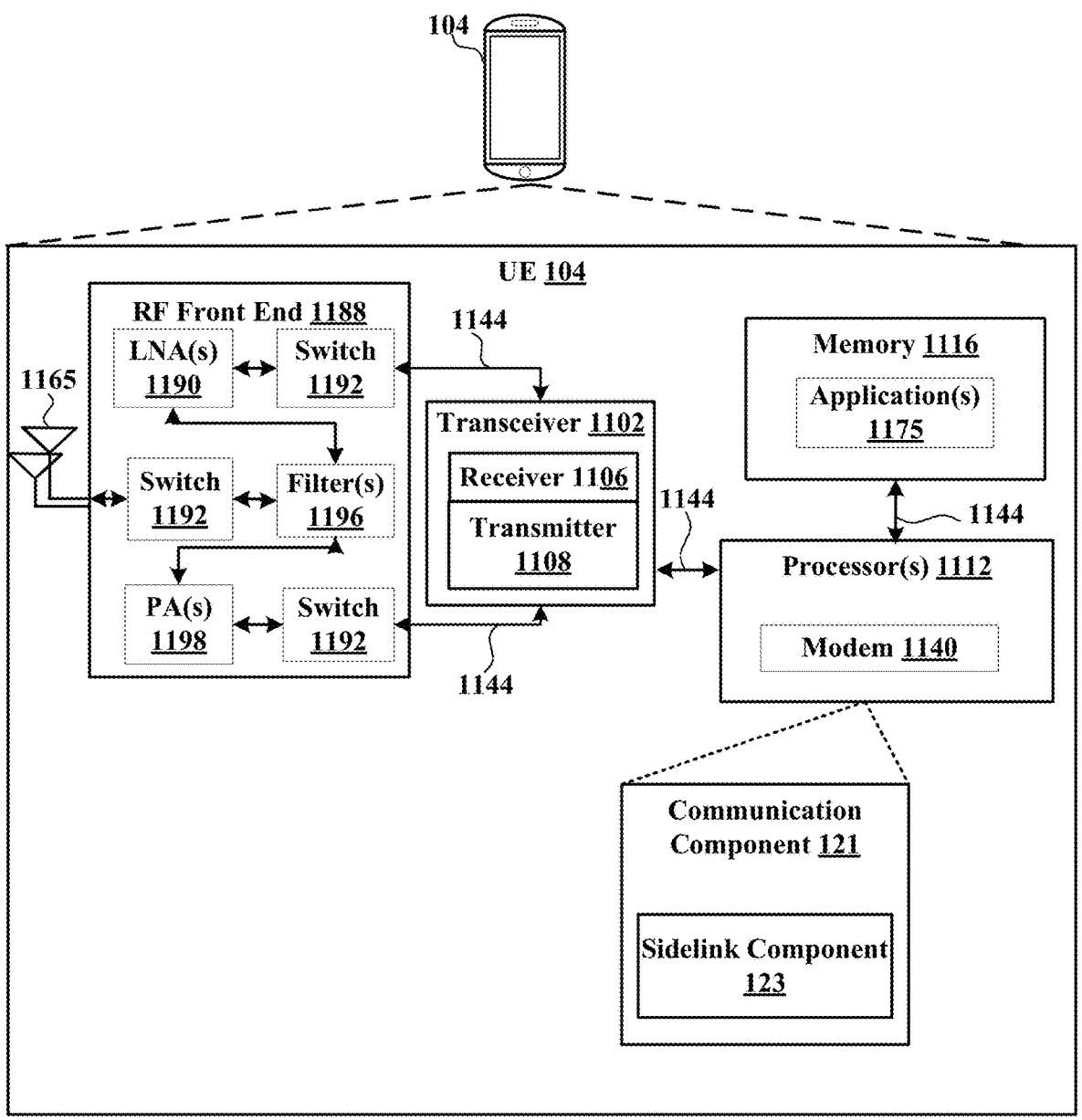
FIG. 11 is a block diagram of an example UE, in accordance with various aspects of the present disclosure.

Referring to FIG. 7, an example method 700 of wireless communication may be performed by the UE 104*b*, which may include one or more components as discussed in FIG. 1, 4, or 11, and which may set-up, activation, and deactivation of sidelink carrier aggregation as discussed above with regard to FIGS. 1-4.

At 702, method 700 includes receiving a configuration indicating a subset of Uu CCs of a plurality of Uu CCs from a network entity. For example, in an aspect, the UE 104*b* may operate one or any combination of antennas 1165, RF front end 1188, transceiver 1102, processor 1112, memory 1116, modem 1140, or communication component 121 in combination with the sidelink component 123 to receive a configuration indicating a subset of Uu CCs of a plurality of Uu CCs from a network entity. Thus, the UE 104*b*, antennas 1165, RF front end 1188, transceiver 1102, processor 1112, memory 1116, modem 1140, and communication component 121 may define the means for receiving a configuration indicating a subset of Uu CCs of a plurality of Uu CCs from a network entity. For example, in an aspect, the UE 104*b* and/or the communication component 121 in combination with the sidelink component 123 may receive a signal and process the signal into a configuration, and/or performs other signal processes such as described above with respect to FIG. 3.

At 704, method 700 includes receiving a DCI via the subset of Uu CCs from the network entity based on receiving the configuration, wherein the DCI schedules sidelink transmissions for the first UE via a plurality of sidelink CCs. For example, in an aspect, the UE 104*b* may operate one or any combination of antennas 1165, RF front end 1188, transceiver 1102, processor 1112, memory 1116, modem 1140, or communication component 121 in combination with the sidelink component 123 to receive a DCI via the subset of Uu CCs from the network entity based on receiving the configuration, wherein the DCI schedules sidelink transmissions for the first UE via a plurality of sidelink CCs. Thus, the UE 104*b*, antennas 1165, RF front end 1188, transceiver 1102, processor 1112, memory 1116, modem 1140, and communication component 121 may define the means for receiving a DCI via the subset of Uu CCs from the network entity based on receiving the configuration, wherein the DCI schedules sidelink transmissions for the first UE via a plurality of sidelink CCs. For example, in an aspect, the UE 104*b* and/or the communication component 121 in combination with the sidelink component 123 may receive a signal and process the signal into a DCI, and/or performs other signal processes such as described above with respect to FIG. 3.

At 706, method 700 includes communicating on a subset of sidelink CCs of the plurality of sidelink CCs with a second UE based on the DCI. For example, in an aspect, the UE 104*b* may operate one or any combination of antennas 1165, RF front end 1188, transceiver 1102, processor 1112, memory 1116, modem 1140, or communication component 121 in combination with the sidelink component 123 to communicate on a subset of sidelink CCs of the plurality of sidelink CCs with a second UE based on the DCI. Thus, the UE 104*b*, antennas 1165, RF front end 1188, transceiver 1102, processor 1112, memory 1116, modem 1140, and communication component 121 may define the means for communicating on a subset of sidelink CCs of the plurality of sidelink CCs with a second UE based on the DCI. For example, in an aspect, the UE 104*b* and/or the communication component 121 in combination with the sidelink component 123 may process a number of signals and communicate the signals to a second UE, and/or performs other signal processes such as described above with respect to FIG. 3.

In some implementations of method 700, the communicating component 121, such as in conjunction with sidelink component 123, transceiver 1102, processor 1112, memory 1116, or modem 1140, configured to receive the DCI in the subset of Uu CCs from the network entity further comprises performing a blind search procedure for the DCI in each Uu CC of the subset of Uu CCs; and identifying the DCI in an Uu CC of the subset of CCs based on the blind search procedure.

In some implementations of method 700, the DCI corresponds to a mode 1 message with resource allocation to the first UE for a sidelink transmission.

In some implementations of method 700, the communicating component 121, such as in conjunction with sidelink component 123, transceiver 1102, processor 1112, memory 1116, or modem 1140, configured to receive the DCI in the subset of Uu CCs from the network entity further comprises receiving the DCI in the subset of Uu CCs with a resource allocation for a sidelink transmission between the first UE and the second UE.

In some implementations of method 700, the communicating component 121, such as in conjunction with sidelink component 123, transceiver 1102, processor 1112, memory 1116, or modem 1140, configured to communicate on the subset of sidelink CCs with the second UE further comprises transmitting one or more sidelink control information (SCI) to the second UE.

In some implementations of method 700, the one or more SCI include SCI1 and SCI2.

In some implementations of method 700, the SCI1 and SCI2 include resource information and transmission parameters about a sidelink transmission between the first UE and the second UE.

In some implementations of method 700, the one or more SCI correspond to a physical sidelink control channel (PSCCH) and a physical sidelink shared channel (PSSCH).

Figure 8:
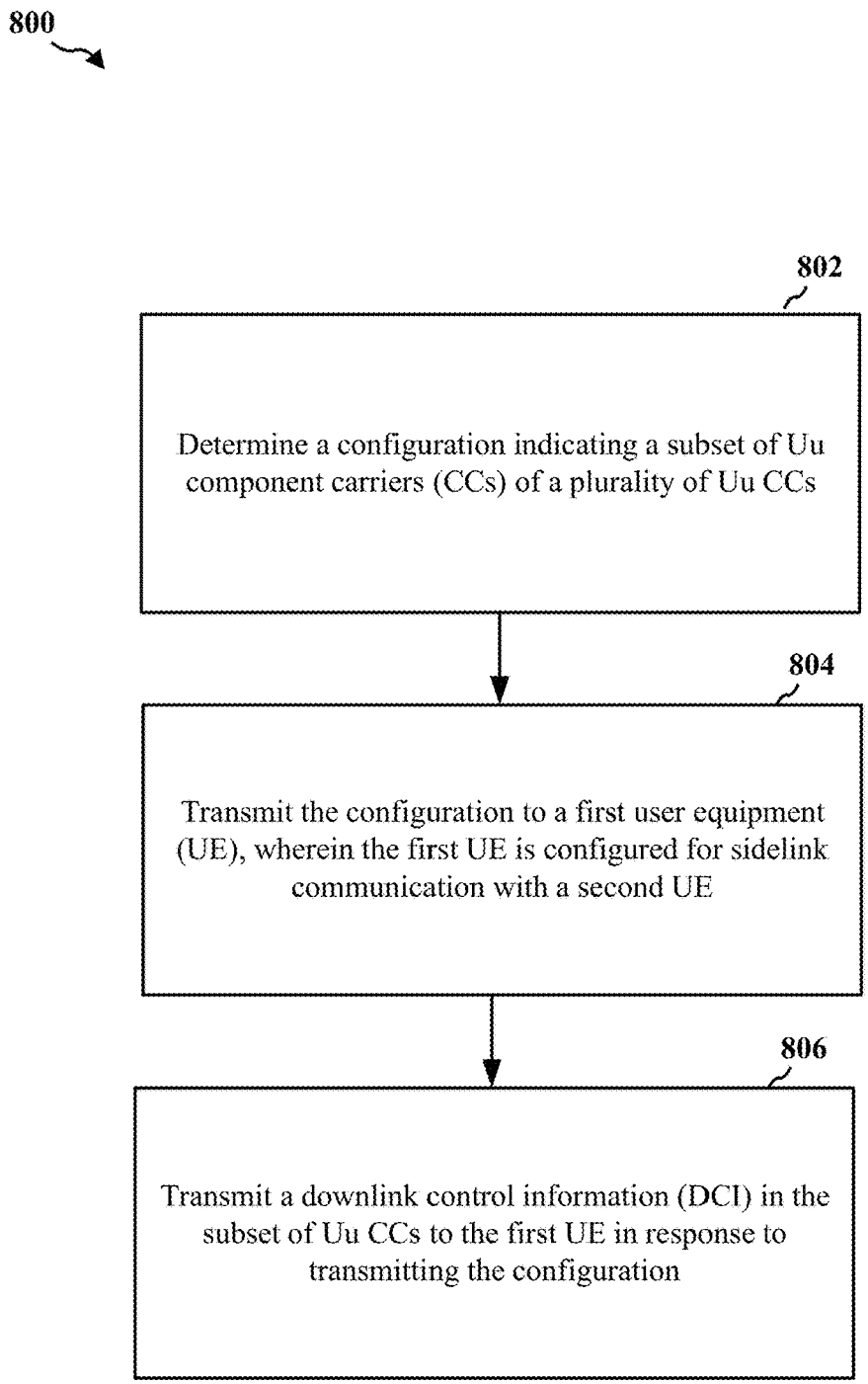
FIG. 8 is a flowchart of another example method of wireless communication of a network entity operable in the system of FIG. 1 in accordance with one or more aspects of the present disclosure.
Figure 12:
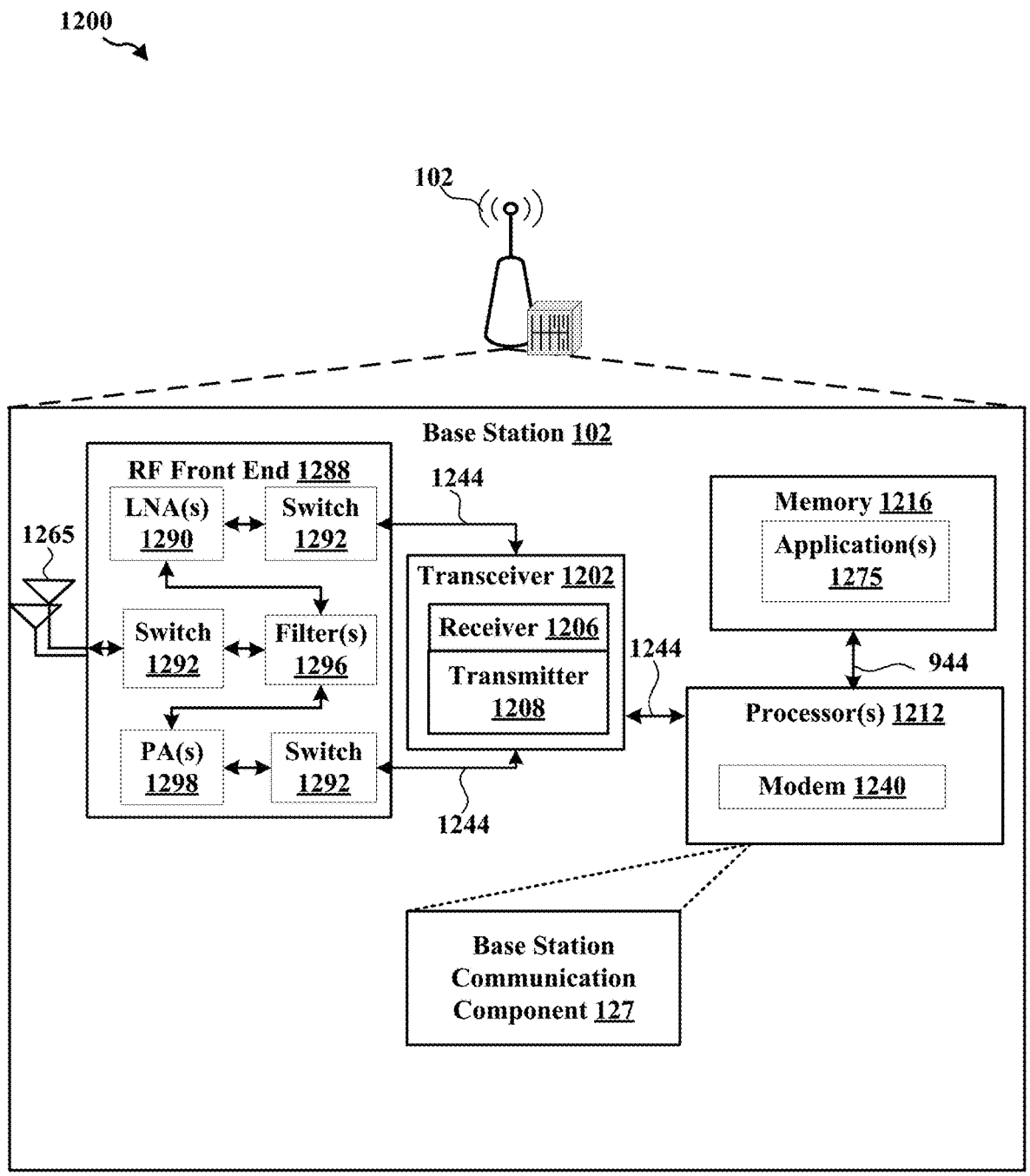
FIG. 12 is a block diagram of an example base station, in accordance with various aspects of the present disclosure.

Referring to FIG. 8, an example method 800 of wireless communication may be performed by the network entity 102, which may include one or more components as discussed in FIG. 1, 4, or 12, and which may set-up, activation, and deactivation of sidelink carrier aggregation as discussed above with regard to FIGS. 1-4.

At 802, method 800 includes determining a configuration indicating a subset of Uu CCs of a plurality of Uu CCs. For example, in an aspect, the network entity 102 may operate one or any combination of antennas 1265, RF front end 1288, transceiver 1202, processor 1212, memory 1216, modem 1240, or base station communication component 127 to determine a configuration indicating a subset of Uu CCs of a plurality of Uu CCs. Thus, the network entity 102, antennas 1265, RF front end 1288, transceiver 1202, processor 1212, memory 1216, modem 1240, and base station communication component 127 may define the means for determining a configuration indicating a subset of Uu CCs of a plurality of Uu CCs. For example, in an aspect, the network entity 102 and/or the base station communication component 127 may perform one or more determinations based on one or more processed signals, and/or performs other signal processes such as described above with respect to FIG. 3.

At 804, method 800 includes transmitting the configuration to a first UE, wherein the first UE is configured for sidelink communication with a second UE. For example, in an aspect, the network entity 102 may operate one or any combination of antennas 1265, RF front end 1288, transceiver 1202, processor 1212, memory 1216, modem 1240, or base station communication component 127 to transmit the configuration to a first UE 104b, wherein the first UE is configured for sidelink communication with a second UE 104a. Thus, the network entity 102, antennas 1265, RF front end 1288, transceiver 1202, processor 1212, memory 1216, modem 1240, and base station communication component 127 may define the means for transmitting the configuration to a first UE, wherein the first UE is configured for sidelink communication with a second UE. For example, in an aspect, the network entity 102 and/or the base station communication component 127 may process a configuration into a signal and transmit the signal to the first UE 104b, and/or performs other signal processes such as described above with respect to FIG. 3.

At 806, method 800 includes transmitting a DCI in the subset of Uu CCs to the first UE in response to transmitting the configuration. For example, in an aspect, the network entity 102 may operate one or any combination of antennas 1265, RF front end 1288, transceiver 1202, processor 1212, memory 1216, modem 1240, or base station communication component 127 to transmit a DCI in the subset of Uu CCs to the first UE in response to transmitting the configuration. Thus, the network entity 102, antennas 1265, RF front end 1288, transceiver 1202, processor 1212, memory 1216, modem 1240, and base station communication component 127 may define the means for transmitting a DCI in the subset of Uu CCs to the first UE in response to transmitting the configuration. For example, in an aspect, the network entity 102 and/or the base station communication component 127 may process a DCI into a signal and transmit the signal to the first UE 104b, and/or performs other signal processes such as described above with respect to FIG. 3.

In some implementations of method 800, the DCI corresponds to a mode 1 message with resource allocation to the first UE for a sidelink transmission with the second UE.

In some implementations of method 800, the communicating component 127, such as in conjunction with transceiver 1202, processor 1212, memory 1216, or modem 1240, is configured to transmit the DCI in the subset of Uu CCs to the first UE further comprises transmitting the DCI in the subset of Uu CCs with a resource allocation for a sidelink transmission between the first UE and the second UE.

Figure 9:
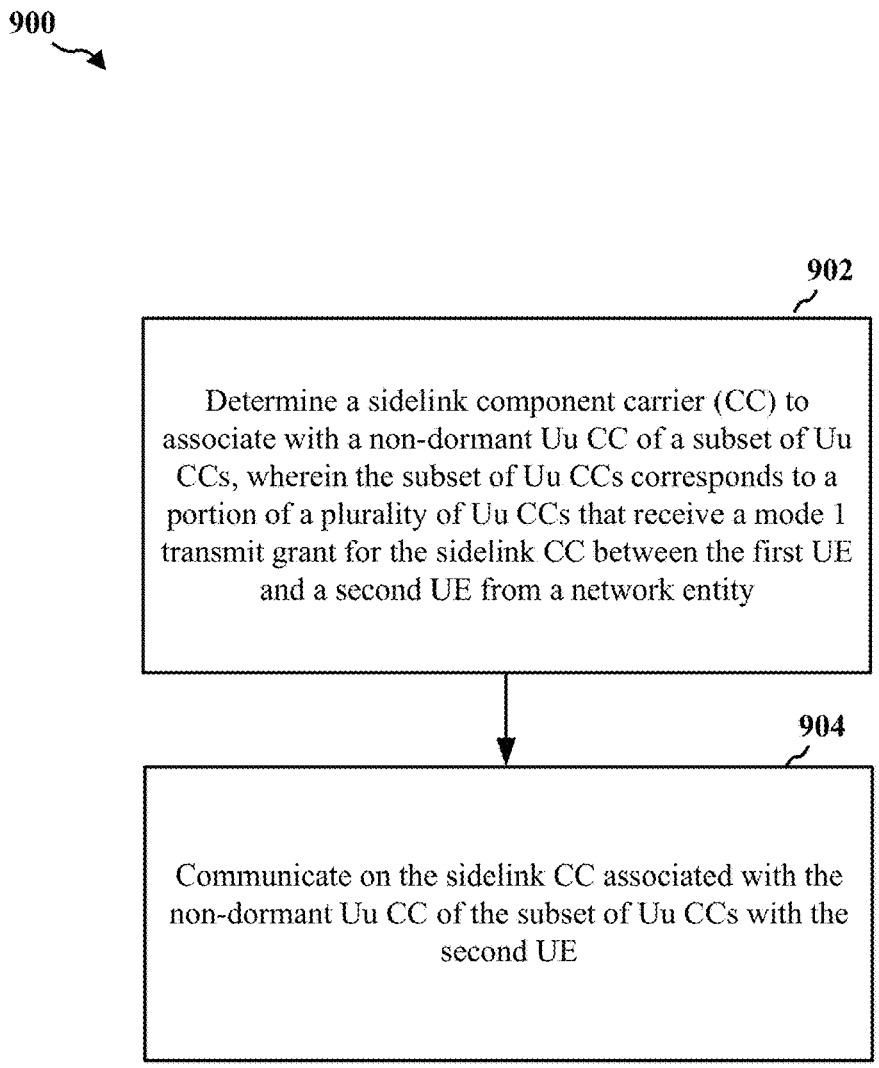
FIG. 9 is a flowchart of another example method of wireless communication of a network entity operable in the system of FIG. 1 in accordance with one or more aspects of the present disclosure.

Referring to FIG. 9, an example method 900 of wireless communication may be performed by the UE 104b, which may include one or more components as discussed in FIG. 1, 4, or 11, and which may set-up, activation, and deactivation of sidelink carrier aggregation as discussed above with regard to FIGS. 1-4.

At 902, method 900 includes determining a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE and a second UE from a network entity. For example, in an aspect, the UE 104b may operate one or any combination of antennas 1165, RF front end 1188, transceiver 1102, processor 1112, memory 1116, modem 1140, or communication component 121 in combination with the sidelink component 123 to determine a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE 104b and a second UE 104a from a network entity 102. Thus, the UE 104b, antennas 1165, RF front end 1188, transceiver 1102, processor 1112, memory 1116, modem 1140, and communication component 121 may define the means for determining a sidelink CC to associate with a non-dormant Uu CC of a subset of Uu CCs, wherein the subset of Uu CCs corresponds to a portion of a plurality of Uu CCs that receive a mode 1 transmit grant for the sidelink CC between the first UE and a second UE from a network entity. For example, in an aspect, the UE 104b and/or the communication component 121 in combination with the sidelink component 123 may perform one or more determinations based on one or more received signals, and/or performs other signal processes such as described above with respect to FIG. 3.

At 904, method 900 includes communicating on the sidelink CC associated with the non-dormant Uu CC of the subset of Uu CCs with the second UE. For example, in an aspect, the UE 104b may operate one or any combination of antennas 1165, RF front end 1188, transceiver 1102, processor 1112, memory 1116, modem 1140, or communication component 121 in combination with the sidelink component 123 to communicate on the sidelink CC associated with the non-dormant Uu CC of the subset of Uu CCs with the second UE 104a. Thus, the UE 104b, antennas 1165, RF front end 1188, transceiver 1102, processor 1112, memory 1116, modem 1140, and communication component 121 may define the means for communicating on the sidelink CC associated with the non-dormant Uu CC of the subset of Uu CCs with the second UE. For example, in an aspect, the UE 104b and/or the communication component 121 in combination with the sidelink component 123 may process one or more signals during communications with a second UE 104a, and/or performs other signal processes such as described above with respect to FIG. 3.

In some implementations of method 900, the communicating component 121, such as in conjunction with sidelink component 123, transceiver 1102, processor 1112, memory 1116, or modem 1140, configured to determine the sidelink CC to associate with the non-dormant Uu CC of the subset of Uu CCs further comprises receiving a reassociation control message.

In some implementations of method 900, the communicating component 121, such as in conjunction with sidelink component 123, transceiver 1102, processor 1112, memory 1116, or modem 1140, configured to receive the reassociation control message further comprises receiving the reassociation control message with a Uu dormancy indication from the network entity.

In some implementations of method 900, Uu dormancy indication corresponds to at least one of a wake-up signal or non-fallback DCI.

In some implementations of method 900, the communicating component 121, such as in conjunction with sidelink component 123, transceiver 1102, processor 1112, memory 1116, or modem 1140, configured to receive the reassociation control message further comprises receiving the reassociation control message separately from a Uu dormancy indication from the network entity.

In some implementations of method 900, the reassociation control message corresponds to at least one of a DCI or MAC CE indicating reassociation of all sidelink CCs associated with the one or more Uu CCs of the subset of Uu CCs in the dormant state to the non-dormant Uu CC of the subset of Uu CCs.

In some implementations of method 900, the communicating component 121, such as in conjunction with sidelink component 123, transceiver 1102, processor 1112, memory 1116, or modem 1140, configured to determine the sidelink CC to associate with the non-dormant Uu CC of the subset of Uu CCs further comprises configuring the first UE to associate the sidelink CC to the non-dormant Uu CC based on one or more parameters.

In some implementations of method 900, the communicating component 121, such as in conjunction with sidelink component 123, transceiver 1102, processor 1112, memory 1116, or modem 1140, configured to determine the sidelink CC to associate with the non-dormant Uu CC of the subset of Uu CCs further comprises reassociating for the sidelink CC when all of the one or more Uu CCs of the subset of Uu CCs associated with the sidelink CC are in the dormant state.

In some implementations of method 900, the one or more physical downlink control channel (PDCCH) monitoring configurations are transferred from the one or more Uu CCs of the subset of Uu CCs in the dormant state to the non-dormant Uu CC of the subset of Uu CCs.

Referring to FIG. 10, an example method 1000 of wireless communication may be performed by the UE 104b, which may include one or more components as discussed in FIG. 1, 4, or 11, and which may set-up, activation, and deactivation of sidelink carrier aggregation as discussed above with regard to FIGS. 1-4.

At 1002, method 1000 includes determining whether one or more Uu CCs of a subset of Uu CCs is in a dormant state, wherein the subset of Uu CCs corresponds to CCs that transmits a mode 1 transmit grant for a sidelink CC between a first UE and a second UE from the network entity. For example, in an aspect, the UE 104b may operate one or any combination of antennas 1165, RF front end 1188, transceiver 1102, processor 1112, memory 1116, modem 1140, or communication component 121 in combination with the sidelink component 123 to determine whether one or more Uu CCs of a subset of Uu CCs is in a dormant state, wherein the subset of Uu CCs corresponds to CCs that transmits a mode 1 transmit grant for a sidelink CC between a first UE and a second UE from the network entity. Thus, the UE 104b, antennas 1165, RF front end 1188, transceiver 1102, processor 1112, memory 1116, modem 1140, and communication component 121 may define the means for determining whether one or more Uu CCs of a subset of Uu CCs is in a dormant state, wherein the subset of Uu CCs corresponds to CCs that transmits a mode 1 transmit grant for a sidelink CC between a first UE and a second UE from the network entity. For example, in an aspect, the network entity 102 and/or the base station communication component 127 may perform one or more determinations based on processing one or more signals, and/or performs other signal processes such as described above with respect to FIG. 3.

At 1004, method 1000 includes configuring the sidelink CC to associate with a non-dormant Uu CC of the subset of Uu CCs based on the determination that the one or more Uu CCs of the subset of Uu CCs is in the dormant state. For example, in an aspect, the UE 104b may operate one or any combination of antennas 1165, RF front end 1188, transceiver 1102, processor 1112, memory 1116, modem 1140, or communication component 121 in combination with the sidelink component 123 to configure the sidelink CC to associate with a non-dormant Uu CC of the subset of Uu CCs based on the determination that the one or more Uu CCs of the subset of Uu CCs is in the dormant state. Thus, the UE 104b, antennas 1165, RF front end 1188, transceiver 1102, processor 1112, memory 1116, modem 1140, and communication component 121 may define the means for configuring the sidelink CC to associate with a non-dormant Uu CC of the subset of Uu CCs based on the determination that the one or more Uu CCs of the subset of Uu CCs is in the dormant state. For example, in an aspect, the network entity 102 and/or the base station communication component 127 may process a signal in order to configure a CC, and/or performs other signal processes such as described above with respect to FIG. 3.

In some implementations of method 1000, the communicating component 121, such as in conjunction with sidelink component 123, transceiver 1102, processor 1112, memory 1116, or modem 1140, configured to configure the sidelink CC to associate with the non-dormant Uu CC of the subset of Uu CCs further comprises transmitting a reassociation control message.

In some implementations of method 1000, the communicating component 121, such as in conjunction with sidelink component 123, transceiver 1102, processor 1112, memory 1116, or modem 1140, configured to transmit the reassociation control message further comprises transmitting the reassociation control message with a Uu dormancy indication to the first UE.

In some implementations of method 1000, the Uu dormancy indication corresponds to at least one of a wake-up signal or non-fallback DCI.

In some implementations of method 1000, the communicating component 121, such as in conjunction with sidelink component 123, transceiver 1102, processor 1112, memory 1116, or modem 1140, configured to transmit the reassociation control message further comprises transmitting the reassociation control message separately from a Uu dormancy indication to the first UE.

In some implementations of method 1000, the reassociation control message corresponds to at least one of a DCI or MAC CE indicating reassociation of all sidelink CCs associated with the one or more Uu CCs of the subset of Uu CCs in the dormant state to the non-dormant Uu CC of the subset of Uu CCs.

In some implementations of method 1000, the communicating component 121, such as in conjunction with sidelink component 123, transceiver 1102, processor 1112, memory 1116, or modem 1140, configured to configure the sidelink CC to associate with the non-dormant Uu CC of the subset of Uu CCs further comprises configuring the first UE to associate the sidelink CC to the non-dormant Uu CC.

In some implementations of method 1000, the communicating component 121, such as in conjunction with sidelink component 123, transceiver 1102, processor 1112, memory 1116, or modem 1140, configured to configure the sidelink CC to associate with the non-dormant Uu CC of the subset of Uu CCs further comprises reassociating for the sidelink CC when all of the one or more Uu CCs of the subset of Uu CCs associated with the sidelink CC are in the dormant state.

In some implementations of method 1000, one or more PDCCH monitoring configurations are transferred from the one or more Uu CCs of the subset of Uu CCs in the dormant state to the non-dormant Uu CC of the subset of Uu CCs.

Referring to FIG. 11, one example of an implementation of UE 104, including UE 104b and/or UE 104a, may include a variety of components, some of which have already been described above and are described further herein, including components such as one or more processors 1112 and memory 1116 and transceiver 1102 in communication via one or more buses 1144, which may operate in conjunction with modem 1140 and/or communication component 121 and sidelink component 123 configured for sidelink carrier aggregation.

In an aspect, the one or more processors 1112 can include a modem 1140 and/or can be part of the modem 1140 that uses one or more modem processors. Thus, the various functions related to configuration component 198 may be included in modem 1140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1140 associated with configuration component 198 may be performed by transceiver 1102.

Also, memory 1116 may be configured to store data used herein and/or local versions of applications 1175 or communicating component 1142 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining communication component 121 and/or one or more of its subcomponents, and/or data associated therewith, when UE 104 is operating at least one processor 1112 to execute communication component 121 and/or one or more of its subcomponents.

Transceiver 1102 may include at least one receiver 1106 and at least one transmitter 1108. Receiver 1106 may include hardware and/or software executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware and/or software executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. The one or more antennas 1165 may include one or more antenna panels and/or sub-arrays, such as may be used for beamforming. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1140 can configure transceiver 1102 to operate at a specified frequency and power level based on the UE configuration of the UE 104 and the communication protocol used by modem 1140.

In an aspect, modem 1140 can be a multiband-multimode modem, which can process digital data and communicate with transceiver 1102 such that the digital data is sent and received using transceiver 1102. In an aspect, modem 1140 can be multiband and be configured to support multiple frequency bands for a specific communications protocol. In an aspect, modem 1140 can be multimode and be configured to support multiple operating networks and communications protocols. In an aspect, modem 1140 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1112 may correspond to one or more of the processors described in connection with the UE in FIG. 4. Similarly, the memory 1116 may correspond to the memory described in connection with the UE in FIG. 4.

Referring to FIG. 12, one example of an implementation of base station 102 (e.g., a base station 102, 102*a*, and/or 102*b*, as described above) may include a variety of components, some of which have already been described above, but including components such as one or more processors 1212 and memory 1216 and transceiver 1202 in communication via one or more buses 1244, which may operate in conjunction with modem 1240 and base station communication component 127 configured to set-up, activation, and deactivation of sidelink carrier aggregation.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

In an aspect, the processor(s) 1212 may correspond to one or more of the processors described in connection with the base station in FIG. 4. Similarly, the memory 1216 may correspond to the memory described in connection with the base station in FIG. 4.

The following provides an overview of examples of the present disclosure:

Example 1. An apparatus for wireless communication at a first user equipment (UE), comprising: a transceiver; a memory; and one or more processors coupled with the transceiver and the memory, wherein the one or more processors and the memory are configured to: receive a configuration indicating a subset of Uu component carriers (CCs) of a plurality of Uu CCs from a network entity; receive a downlink control information (DCI) via the subset of Uu CCs from the network entity based on receiving the configuration, wherein the DCI schedules sidelink transmissions for the first UE via a plurality of sidelink CCs; and communicate on a subset of sidelink CCs of the plurality of sidelink CCs with a second UE based on the DCI.

Example 2. The apparatus of example 1, wherein the one or more processors configured to receive the DCI in the subset of Uu CCs from the network entity are further configured to: perform a blind search procedure for the DCI in each Uu CC of the subset of Uu CCs; and identify the DCI in an Uu CC of the subset of CCs based on the blind search procedure.

Example 3. The apparatus of example 1, wherein the DCI corresponds to a mode 1 message with resource allocation to the first UE for a sidelink transmission.

Example 4. The apparatus of example 1, wherein the one or more processors configured to receive the DCI in the subset of Uu CCs from the network entity are further configured to receive the DCI in the subset of Uu CCs with a resource allocation for a sidelink transmission between the first UE and the second UE.

Example 5. The apparatus of example 1, wherein the one or more processors configured to communicate on the subset of sidelink CCs with the second UE are further configured to transmit one or more sidelink control information (SCI) to the second UE.

Example 6. The apparatus of examples 1 and 5, wherein the one or more SCI include SCI1 and SCI2.

Example 7. The apparatus of examples 1, 5, and 6, wherein the SCI1 and SCI2 include resource information and transmission parameters about a sidelink transmission between the first UE and the second UE.

Example 8. The apparatus of examples 1 and 5, wherein the one or more SCI correspond to a physical sidelink control channel (PSCCH) and a physical sidelink shared channel (PSSCH).

Example 9. An apparatus for wireless communication at a network entity, comprising: a transceiver; a memory; and one or more processors coupled with the transceiver and the memory, wherein the one or more processors and the memory are configured to: determine a configuration indicating a subset of Uu component carriers (CCs) of a plurality of Uu CCs; transmit the configuration to a first user equipment (UE), wherein the first UE is configured for sidelink communication with a second UE; and transmit a downlink control information (DCI) in the subset of Uu CCs to the first UE in response to transmitting the configuration.

Example 10. The apparatus of example 9, wherein the DCI corresponds to a mode 1 message with resource allocation to the first UE for a sidelink transmission with the second UE.

Example 11. The apparatus of example 9, wherein the one or more processors configured to transmit the DCI in the subset of Uu CCs to the first UE are further configured to transmit the DCI in the subset of Uu CCs with a resource allocation for a sidelink transmission between the first UE and the second UE.

Example 12. An apparatus for wireless communication at a first user equipment (UE), comprising: a transceiver; a memory; and one or more processors coupled with the transceiver and the memory, wherein the one or more processors and the memory are configured to: determine a sidelink component carrier (CC) to associate with a non-dormant Uu CC of a subset of Uu CCs, wherein the subset of Uu CCs corresponds to a portion of a plurality CCs that receive a mode 1 transmit grant for the sidelink CC between the first UE and a second UE from a network entity; and communicate on the sidelink CC associated with the non-dormant Uu CC of the subset of Uu CCs with the second UE.

Example 13. The apparatus of example 12, wherein the one or more processors configured to determine the sidelink CC to associate with the non-dormant Uu CC of the subset of Uu CCs are further configured to receive a reassociation control message.

Example 14. The apparatus of examples 12 and 13, wherein the one or more processors configured to receive the reassociation control message are further configured to receive the reassociation control message with a Uu dormancy indication from the network entity.

Example 15. The apparatus of examples 12-14, wherein Uu dormancy indication corresponds to at least one of a wake-up signal or non-fallback downlink control information (DCI).

Example 16. The apparatus of examples 12 and 13, wherein the one or more processors configured to receive the reassociation control message are further configured to receive the reassociation control message separately from a Uu dormancy indication from the network entity.

Example 17. The apparatus of examples 12, 13, and 16, wherein the reassociation control message corresponds to at least one of a downlink control information (DCI) or media access control (MAC) control element (CE) indicating reassociation of all sidelink CCs associated with one or more Uu CCs of the subset of Uu CCs in a dormant state to the non-dormant Uu CC of the subset of Uu CCs.

Example 18. The apparatus of example 12, wherein the one or more processors configured to determine the sidelink CC to associate with the non-dormant Uu CC of the subset of Uu CCs are further configured to configure the first UE to associate the sidelink CC to the non-dormant Uu CC based on one or more parameters.

Example 19. The apparatus of example 12, wherein the one or more processors configured to determine the sidelink CC to associate with the non-dormant Uu CC of the subset of Uu CCs are further configured to reassociate for the sidelink CC when all of one or more Uu CCs of the subset of Uu CCs associated with the sidelink CC are in a dormant state.

Example 20. The apparatus of example 12, wherein one or more physical downlink control channel (PDCCH) monitoring configurations are transferred from the one or more Uu CCs of the subset of Uu CCs in the dormant state to the non-dormant Uu CC of the subset of Uu CCs.

Example 21. An apparatus for wireless communication at a network entity, comprising: a transceiver; a memory; and one or more processors coupled with the transceiver and the memory, wherein the one or more processors and the memory are configured to: determine whether one or more Uu component carriers (CCs) of a subset of Uu CCs is in a dormant state, wherein the subset of Uu CCs corresponds to CCs that transmits a mode 1 transmit grant for a sidelink CC between a first user equipment (UE) and a second UE from the network entity; and configure the sidelink CC to associate with a non-dormant Uu CC of the subset of Uu CCs based on the determination that the one or more Uu CCs of the subset of Uu CCs is in the dormant state.

Example 22. The apparatus of example 21, wherein the one or more processors configured to configure the sidelink CC to associate with the non-dormant Uu CC of the subset of Uu CCs are further configured to transmit a reassociation control message.

Example 23. The apparatus of examples 21 and 22, wherein the one or more processors configured to transmit the reassociation control message are further configured to transmit the reassociation control message with a Uu dormancy indication to the first UE.

Example 24. The apparatus of example 21-23, wherein the Uu dormancy indication corresponds to at least one of a wake-up signal or non-fallback downlink control information (DCI).

Example 25. The apparatus of examples 21 and 22, wherein the one or more processors configured to transmit the reassociation control message are further configured to transmit the reassociation control message separately from a Uu dormancy indication to the first UE.

Example 26. The apparatus of examples 21, 22, and 25, wherein the reassociation control message corresponds to at least one of a downlink control information (DCI) or media access control (MAC) control element (CE) indicating reassociation of all sidelink CCs associated with the one or more Uu CCs of the subset of Uu CCs in the dormant state to the non-dormant Uu CC of the subset of Uu CCs.

Example 27. The apparatus of example 21, wherein the one or more processors configured to configure the sidelink CC to associate with the non-dormant Uu CC of the subset of Uu CCs are further configured to configure the first UE to associate the sidelink CC to the non-dormant Uu CC.

Example 28. The apparatus of example 21, wherein the one or more processors configured to configure the sidelink CC to associate with the non-dormant Uu CC of the subset of Uu CCs are further configured to reassociate for the sidelink CC when all of the one or more Uu CCs of the subset of Uu CCs associated with the sidelink CC are in the dormant state.

Example 29. The apparatus of example 21, wherein one or more physical downlink control channel (PDCCH) monitoring configurations are transferred from the one or more Uu CCs of the subset of Uu CCs in the dormant state to the non-dormant Uu CC of the subset of Uu CCs.

Example 30. The apparatus of examples 21 and 29, wherein the one or more of the PDCCH monitoring configurations of the Uu CCs is transferred to the non-dormant Uu CC via dynamic configuration or a rule based configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), comprising:
a transceiver;
a memory; and
one or more processors coupled with the transceiver and the memory, wherein the one or more processors and the memory are configured to:
associate a sidelink component carrier (CC) with a first non-dormant Uu CC of a subset of Uu CCs, wherein the subset of Uu CCs corresponds to a portion of a plurality CCs that receive a mode 1 transmit grant for the sidelink CC between the first UE and a second UE from a network entity;
reassociate the sidelink CC from the first non-dormant Uu CC to a second non-dormant Uu CC of the subset of Uu CCs when the first non-dormant Uu CC transitions to a dormant state; and
communicate on the sidelink CC associated with the second non-dormant Uu CC with the second UE.

2. The apparatus of claim 1, wherein the one or more processors are further configured to receive a reassociation control message indicating reassociation of all sidelink CCs associated with one or more Uu CCs of the subset of Uu CCs in a dormant state to the non-dormant Uu CC of the subset of Uu CCs.

3. The apparatus of claim 2, wherein the one or more processors configured to receive the reassociation control message are further configured to receive the reassociation control message with a Uu dormancy indication from the network entity.

4. The apparatus of claim 3, wherein Uu dormancy indication corresponds to at least one of a wake-up signal or non-fallback downlink control information (DCI).

5. The apparatus of claim 2, wherein the one or more processors configured to receive the reassociation control message are further configured to receive the reassociation control message separately from a Uu dormancy indication from the network entity.

6. The apparatus of claim 5, wherein the reassociation control message corresponds to at least one of a downlink control information (DCI) or media access control (MAC) control element (CE).

7. The apparatus of claim 1, wherein the one or more processors are further configured to configure the first UE to associate the sidelink CC to the second non-dormant Uu CC based on one or more parameters.

8. The apparatus of claim 1, wherein one or more physical downlink control channel (PDCCH) monitoring configurations are transferred from the one or more Uu CCs of the subset of Uu CCs in the dormant state to the second non-dormant Uu CC of the subset of Uu CCs.

9. The apparatus of claim 1, wherein the one or more processors configured to reassociate the sidelink CC from the first non-dormant Uu CC to a second non-dormant Uu CC of the subset of Uu CCs are further configured to reassociate for the sidelink CC when all of one or more Uu CCs of the subset of Uu CCs associated with the sidelink CC are in a dormant state.

10. An apparatus for wireless communication at a network entity, comprising:
a transceiver;
a memory; and
one or more processors coupled with the transceiver and the memory, wherein the one or more processors and the memory are configured to:
determine whether one or more Uu component carriers (CCs) of a subset of Uu CCs is in a dormant state, wherein the subset of Uu CCs corresponds to CCs that transmits a mode 1 transmit grant for a sidelink CC between a first user equipment (UE) and a second UE from the network entity;
reassociate the sidelink CC from a first non-dormant Uu CC to a second non-dormant Uu CC of the subset of Uu CCs when the first non-dormant Uu CC transitions to the dormant state; and
configure the sidelink CC to associate with the second non-dormant Uu CC of the subset of Uu CCs based on the reassociation of the sidelink CC from the first non-dormant Uu CC to the second non-dormant Uu CC.

11. The apparatus of claim 10, wherein the one or more processors further configured to transmit a reassociation control message indicating reassociation of all sidelink CCs associated with the one or more Uu CCs of the subset of Uu CCs in the dormant state to the non-dormant Uu CC of the subset of Uu CCs.

12. The apparatus of claim 11, wherein the one or more processors configured to transmit the reassociation control message are further configured to transmit the reassociation control message with a Uu dormancy indication to the first UE.

13. The apparatus of claim 12, wherein the Uu dormancy indication corresponds to at least one of a wake-up signal or non-fallback downlink control information (DCI).

14. The apparatus of claim 11, wherein the one or more processors configured to transmit the reassociation control message are further configured to transmit the reassociation control message separately from a Uu dormancy indication to the first UE.

15. The apparatus of claim 14, wherein the reassociation control message corresponds to at least one of a downlink control information (DCI) or media access control (MAC) control element (CE) indicating reassociation of all sidelink CCs associated with the one or more Uu CCs of the subset of Uu CCs in the dormant state to the non dormant Uu CC of the subset of Uu CCs.

16. The apparatus of claim 10, wherein the one or more processors configured to configure the sidelink CC to associate with the second non-dormant Uu CC of the subset of Uu CCs are further configured to configure the first UE to associate the sidelink CC to the second non-dormant Uu CC.

17. The apparatus of claim 10, wherein one or more physical downlink control channel (PDCCH) monitoring configurations are transferred from the one or more Uu CCs of the subset of Uu CCs in the dormant state to the second non-dormant Uu CC of the subset of Uu CCs.

18. The apparatus of claim 17, wherein the one or more of the PDCCH monitoring configurations of the Uu CCs is transferred to the second non-dormant Uu CC via dynamic configuration or a rule based configuration.

19. The apparatus of claim 10, wherein the one or more processors configured to configure the sidelink CC to associate with the second non-dormant Uu CC of the subset of Uu CCs are further configured to reassociate for the sidelink CC when all of the one or more Uu CCs of the subset of Uu CCs associated with the sidelink CC are in the dormant state.

* * * * *